United States Patent
Wilson

(10) Patent No.: US 6,170,190 B1
(45) Date of Patent: Jan. 9, 2001

(54) RIBBON FIN LURE

(76) Inventor: Scott R. Wilson, 2415 Lake Talmadge Dr., DeLand, FL (US) 32724

(*) Notice: Under 35 U.S.C. 154(b), the term of this patent shall be extended for 0 days.

(21) Appl. No.: 09/539,539

(22) Filed: Mar. 31, 2000

Related U.S. Application Data

(62) Division of application No. 09/039,460, filed on Mar. 16, 1998, now abandoned.

(51) Int. Cl.$^7$ .................................................. A01K 85/00
(52) U.S. Cl. ......................... 43/42.28; 43/42.24; 43/42.26
(58) Field of Search ................................ 43/42.1, 42.24, 43/42.26, 42.28

(56) References Cited

U.S. PATENT DOCUMENTS

| | | | | |
|---|---|---|---|---|
| 4,214,396 | * | 7/1980 | Firmin | 43/42.24 |
| 5,465,523 | * | 11/1995 | Garst | 43/42.24 |
| 5,640,798 | * | 6/1997 | Garst | 43/42.24 X |

* cited by examiner

Primary Examiner—Robert P. Swiatek
(74) Attorney, Agent, or Firm—Julian C. Renfro, Esq.

(57) ABSTRACT

An artificial fishing lure of resilient, flexible material created in an initially curved configuration, which lure, when attached to a line and pulled through the water, essentially duplicates the swimming motion of an eel, snake, or lizard. This novel lure has a body portion and a flexible, elongate, relatively thin dorsal fin integral with the body portion and extending longitudinally for substantially the entire length of the body portion. One embodiment of my novel lure has a body portion of alternating large and relatively small sections, with each of the relatively small sections having major and minor dimensions, and with the major dimension of each of the relatively small sections being perpendicular to the plane of the relatively thin fin. The minor dimension of each of the relatively small sections is sufficiently small as to enable such small sections to serve as hinging points of the body portion such that the lure can move from an initially curved configuration into an essentially straight configuration. Significantly, the relatively thin fin is essentially flat when the lure is in a curved configuration, but undertakes a highly desirable rippled configuration when the lure has been put into use and assumes a relatively straight configuration.

11 Claims, 7 Drawing Sheets

RIBBON FIN LURE

RELATIONSHIP TO PREVIOUS APPLICATION

This is a Divisional case based upon my pending patent application entitled "Ribbon Fin Lure," filed Mar. 16, 1998, Ser. No. 09/039,460, now abandoned.

BACKGROUND OF THE INVENTION

Because of their large numbers and ease in harvesting, fish not only constitute an important food source for mankind, but also provide an important sport. Recreation fishing is enjoyed throughout the world, and artificial lures and bait have become an important tool in the arsenal of the angler.

In the past, lures have been constructed of many different materials, such as of silk, skin, feathers, wood, metals and the like. With the advent of easily formed plastics, it has been relatively easy to fashion lures to imitate bait such as shrimp, frogs, insects, fish, worms and the like. One of the latest trends in lure construction is to provide forms which more closely resemble live creatures that arouse the curiosity and rapacity of the fish.

Many of these plastic lures are characterized by long, thin ribbon tails that are curved or shaped to present wiggling or undulating simulated swimming action in the water in order to further attract fish to the lure. A variety of tail shapes, sizes, and thicknesses are currently used in many of the plastic fishing lures on the market today. Typical of the plastic fishing lures used with good success in catching black bass, small mouth bass, and other game fish is the "curly tail" lure having one or more tail segments extending therefrom and curled inwardly or outwardly to a thin ribbon-like point. When the lure is put into the water, the tail undulates or folds and unfolds as it "swims" through the water to attract fish. As described in the Garst Patent No. 5,465,523 entitled "Undulating Single Tail Fishing Lure," lures of this type are shaped from a plastic material that can be easily injection molded in a variety of colors and shapes. Desirable odors can even be synthesized and provided in the lure bodies. Other lures, similar in form, are characterized by a "moving ribbon" appearance as they are drawn through the water.

It is to be noted from the Garst patent that this patentee provides a lure of U-shaped configuration which tends to straighten as it is drawn through the water, but concerning which this patentee says nothing about the fin of his lure undertaking a desired rippling on such occasion. Patentee Garst describes that his lure has a generally triangular cross section with a tall apex and a short base, with the sides of the lure slightly curved in a concave manner. Obviously Garst does not teach a lure having a flexible, elongate dorsal fin that is essentially flat and relatively thin, which is capable of undertaking a pronounced degree of rippling even when it is moved through the water at low speed.

The Hill Patent No. 4,138,792 entitled "Artificial Snake-Eel Body" describes a lure involving an elongate strip member of multi-convolution spiral configuration, which decreases in radius of curvature toward the rear end thereof. The strip is of greater transverse width than thickness and one longitudinal edge of the strip comprises the inner periphery of the spiral and the other longitudinal edge of the strip comprises the outer periphery of the spiral. This patentee sets forth that the strip is constructed of resilient, flexible material and includes, on its large radius of curvature end, an endwise outwardly projecting terminal end portion extending generally axially of the spiral of the strip and intended to simulate the head of a swimming snake or eel. The strip, when moved forwardly through the water, is stated to undulate in the manner of a swimming snake or eel and the patentee states that the "swimming action" thereof is difficult to distinguish from the undulating swimming movement of a snake or eel.

It is most important to note that patentee Hill states in the mid portion of Column 1 of his patent that his elongated strip is constructed of shape retentive flexible material, but it is to be noted that for Hill's strip to be shape retentive is really an undesirable characteristic rather than being a desirable attribute.

One of the problems with constructing a lure having relatively thin fins that ripple in a realistic manner while passing through the water is the expense of creating rippled fins on such a lure. Some manufacturers have created lures with elongate fins having preformed ripples, with these ripples being created by utilizing a pair of interfitting molds carefully configured to form such preformed ripples, but such molds are necessarily expensive to construct.

It is to be noted that neither patentee Garst nor patentee Hill describe the specific configuration of the molds used in the creation of their lures, nor do they explain the particular circumstances under which molding efforts take place.

Many prior art patents relating to injection molding are in existence, and these include the Neuman Patent No. 4,021,515 entitled "Plastic Injection Mold with Self-Adjusting Coring Apparatus"; the Kluge Patent No. 4,437,257 entitled "Foamed Plastic Fishing Lure Body Having a Controlled Density and a One-Piece Wire and a Method for its Manufacture"; the Jaroschek Patent No. 5,090,886 entitled "Apparatus for the Injection Molding of Fluid-Filled Plastic Bodies"; and the Sugiyama et al Patent No. 5,295,801 entitled "Mold for Hollow Injection Molding."

The Littleton Patent No. 4,969,811 entitled "Apparatus for Making Plastic Devices" reveals that it is known to mold plastic fishing lures from suitable plastic utilizing various types of molds. The Littleton patent is not truly consequential to the present invention, however, for it is concerned with the molding of lures having skirts of stranded plastic. Nevertheless, the Littleton patent shows the use of mold cavities involving male and female mold components that cooperate in such a manner that a number of lures having stranded skirts can be molded at one time by the use of a suitable plastic heated to a proper molding temperature.

None of these patents addresses the problems necessarily involved in creating molds that are effective in the injection molding of lures possessing a dorsal fin having molded or built-in ripples.

It is well known that in the molding of plastic fishing lures, upper and lower interfitting molds are utilized, with each mold half being responsible for creating one half of the lure or lures being made each time hot plastic is injected into the contiguous mold halves. Many molds are circular, and enable twelve to eighteen, possibly even more plastic lures to be molded at a time. As is obvious, the contours of the upper mold half must closely match the contours of the lower mold half if lures are to be created that will be attractive enough to be purchased by fishermen. In other words, one mold half must be the mirror image of the other mold half.

In the typical instance, there is a "parting line" or surface plane that is consistent across the entire width of each mold half, but this generality does not closely apply when molds have been created for the injection of lures having built-in or preformed ripples. Starting for example with the lower mold, for one part of a ripple there must be an upwardly curving protrusion extending above the parting line, which is followed by a downwardly curving recess. This downwardly curving recess is then followed by another upwardly curving protrusion above the parting line, which is followed by another downwardly curving recess, and so forth, with this continuing for the length of the rippled fin being created.

Because a pair of molds is involved in the above example for the injection molding of plastic lures, there must necessarily be a properly shaped curved recess in the upper mold corresponding to each upwardly curving protrusion of the lower mold, and quite importantly, there must also be a downwardly curving protrusion on the upper mold directly above each of the downwardly curving recesses of the lower mold. Each of the curving protrusions of the upper and lower molds must necessarily extend beyond the parting line of each mold, and it is manifestly true that each of these protrusions must closely match the inwardly curving recesses of the other mold half if a fin of a desirable, consistent thickness is to be created on each lures.

It is thus to be seen that in order to be able to create a lure having a rippled fin, it would be necessary for there to be several protrusions extending beyond the contours of each mold half, or in other words, these protrusions must extend beyond the parting line of each mold.

The service of a skilled programmer as well as the service of a skilled machinist are necessary for the creation of complex mold halves of this type, with it being necessary for the programmer to start out by writing a program setting forth the specifications of the size of the lure body as well as the specific configuration of the rippled fin that is to form an integral part of the lure body. After the program has been written, the programmer goes to the Computer Numerically Controlled Millport (CNC Millport) in order to actually cut the cavity, typically out of aluminum plate.

The program prepared by the programmer is given to the machinist, who cuts a single cavity prototype, involving top and bottom mold halves. Because the upward protrusions from the lower mold and the downward protrusions from the upper mold necessarily cross the parting line of each mold half if built-in ripples are to be created in the fin of the lure, it is obviously necessary for a considerable amount of aluminum of the plate or disk to be milled away in order to create each mold half. The milling cutter must undergo wide excursions in order to not only remove aluminum for the creation of each cavity in which a lure is to be created, but also to cut the correct arc on each protrusion extending above the parting line of the mold half. Because the parting line must be crossed in both directions by the milling cutter in order to create the several protrusions and the several recesses to be formed in each mold half, it is obvious that much more aluminum must be milled away from each mold half than was involved in the creation of a typical lure in which molded fins were not required. It is also obvious that great care be taken in matching the protrusions and recesses of one mold half with the recesses and protrusions of the other mold half if the rippled fins are to be of a desired thickness.

The milling away of metal on each mold half becomes a very tedious effort, and even an experienced programmer-machinist team will typically need to create eight or so prototypes before suitably accurate mold halves have been evolved, as will enable finished lures to be molded. As an example of cost, each prototype typically costs in the vicinity of $400.00 in programming time, in addition to which is the expense of the aluminum disks.

Numerous prototype lures are made, with the contours of each lure being carefully checked, until finally a lure having a rippled fin of the desired thickness and desired configuration has been created. Once this has been accomplished, it is then possible to create carefully interfitting mold halves that will bring about the simultaneous creation of a dozen or more lures each time hot plastic is injected between the mold halves.

In sharp contrast to the construction of mold halves enabling the creation of lures with built-in ripples of their fins, mold halves responsible for creating lures whose fins are not initially rippled are much less expensive to make inasmuch as no protrusions extending beyond the parting line of the molds are involved.

It was in an effort to overcome the prohibitive cost associated with the creation of molds able to make lures with built-in or preformed ripples that the present invention was evolved.

SUMMARY OF THE INVENTION

An artificial fishing lure in accordance with this invention is created in an initially curved configuration, with the lure being of resilient, flexible plastic material such that when attached to a line and pulled through the water, the lure essentially duplicates the swimming motion of an eel, snake, or lizard. This novel lure has a body portion and a flexible, elongate, relatively thin dorsal fin integral with the body portion and extending longitudinally for substantially the entire length of the body portion.

The fin is essentially flat and relatively thin, whereas the body portion has a non-symmetrical cross section, involving major and minor dimensions.

The major dimension of the body portion is perpendicular to the plane of the relatively thin, flat fin and the minor dimension of the body portion is essentially parallel to the plane of the essentially flat relatively thin fin. The minor dimension is less than $2/3$ of the dimension of the major dimension, with the relative smallness of the minor dimension enabling the lure to move from an initially curved configuration into an essentially straight configuration, with the fin undertaking a highly desirable rippling when the lure has moved into the straight configuration.

One embodiment of this invention involves the lure being in the configuration of a worm, with the body portion of the worm made up of alternating large and relatively small sections, with each of the relatively small sections having major and minor dimensions. The major dimension of each of the relatively small sections is perpendicular to the plane of the relatively thin fin, with this arrangement providing comparatively substantial rigidity to the worm in a direction perpendicular to the plane of the dorsal fin. This lateral rigidity of the worm body provides an ideal mounting for a thin, flexible dorsal fin intended to ripple in such a manner as to closely simulate the motion of a natural prey, or animals of natural prey swimming through the water.

Importantly, the minor dimension of each of the small sections of the worm is sufficiently small as to enable such small sections to serve as hinging points of the body portion of the worm such that the worm can, quite advantageously, readily move from an initially curved configuration into an essentially straight configuration.

Significantly, the relatively thin fin is essentially flat when the lure is in a curved configuration, but the fin advantageously undertakes a highly desirable rippled configuration when the lure body has been moved into a straight configuration.

Another embodiment of this invention involves a lure in the configuration of a lizard having four legs. As in the case with the worm, the lizard has the same relatively thin flexible dorsal fin that is flat when the lizard is being molded, but which fin undertakes a highly advantageous rippling when the lizard has moved into a relatively straight position.

In accordance with another aspect of this invention, appropriately configured mold halves are utilized such that a plurality of lure bodies are created with initially flat dorsal fins, thus avoiding the considerable expense necessarily associated with the creation of mold halves having closely matched protrusions and recesses that in the past were required in order to bring about the creation of lures having rippled dorsal fins.

I have found that if a lure body is configured to have the equivalent of multiple hinge points, by molding the lure body in a curved configuration with a flat fin having a longer outer contour than the outer contour of the body, such fin will undertake a highly desirable rippled configuration upon the lure being straightened out and pulled through the water.

It is to be understood that lures having dorsal fins with preformed ripples created in accordance with the teachings of the prior art have a degree of memory, which is unfortunate in that ripples of such type tend to resist motion of the lure through the water. In other words, the preformed fins on certain lures of the prior art do not freely move back and forth in a realistic "swimming" motion. In contrast with this, when in accordance with the instant invention the dorsal fin is initially created flat, extending around the initially curved body of a lure, such fin is caused to undertake a highly satisfactory type of rippling when the lure is straightened out. When a dorsal fin is initially created flat, it has no memory of permanent ripples, and can therefore adapt readily to the movement of the water, and thereby closely resemble the swimming action of an eel, snake, tadpole or the like, even at very low speeds.

A principal object of this invention is to provide a lure able to be manufactured at low cost, which will have a novel rippled fin enabling the lure, even at low speed, to very realistically duplicate the swimming movements of a snake, eel or other aquatic animal which swims in a wriggling manner.

It is another object of this invention to provide a lure molded in a curved configuration in a low cost mold, with the lure body having an initially flat, thin dorsal fin that will undertake rippling upon the lure body being straightened, with this fin enabling the lure to closely simulate the swimming action of minnows, tadpoles, lizards and other creatures that swim in a manner similar to snakes and eels.

It is yet another object of this invention to provide a lure having considerable flexibility in the plane of the dorsal fin, but having comparatively substantial rigidity in a direction perpendicular to the plane of the dorsal fin, with this lateral rigidity of the lure body providing an ideal mounting for a thin, flexible dorsal fin intended to closely simulate the motion of a natural prey, or animals of natural prey swimming through the water.

It is yet still another object of this invention to provide a lure having a body made up of alternating large and relatively small sections and provided with a thin dorsal fin, with such relatively small body sections serving as hinging points such that the lure body can move readily from the curved configuration in which it was initially created, into an essentially straight configuration, and in doing so, causing the thin dorsal fin to undertake a desirable rippled configuration.

It is a further object of this invention to provide a lure of resilient plastic material that on the one hand is sufficiently flexible as to be molded in one configuration and utilized in a different configuration, yet on the other hand has considerable lateral stability and is sufficiently strong that a fish hook is not likely to tear out of the hook-receiving portion of the lure.

It is a further object of this invention to provide a novel method of creating a lure having a ribbon-like fin extending for a substantial portion of the length of the lure, involving the use of a pair of interfitting mold halves containing half-depth cavities possessing substantial curvature so that when the mold halves are brought into registry, the aligned cavities will be brought into alignment so as to represent a full lure of curved configuration, with each half-depth cavity having along its outer edge, an encircling flat portion the size of a fin capable of being brought into alignment with the encircling flat portion of the other half-depth cavity, such that when molten plastic is injected into the injection port, molten plastic is caused to fill the cavities of both mold halves and thus create a lure of curved configuration having a fin extending along a substantial portion of the length of the lure, with the subsequent straightening of the curved lure causing a desirable rippling of the fin.

These and other objects, features and advantages will become more apparent as the description proceeds.

DETAILED DESCRIPTION

Figure 1:
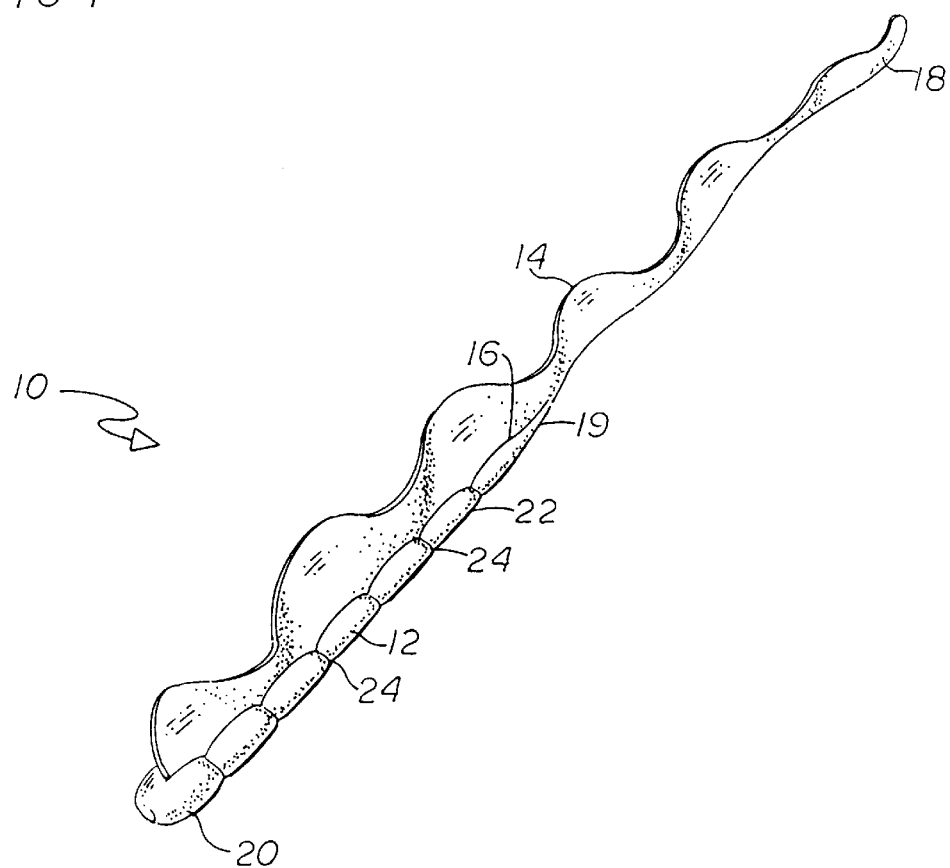
FIG. 1 is a perspective view of an exemplary lure created in accordance with a first embodiment of my invention, wherein the dorsal fin, created in a flat condition on a curved worm body, is able to undertake a substantial amount of rippling upon the worm being straightened.

With initial reference to FIG. 1 it will be seen that I have illustrated an artificial fishing lure of resilient material in accordance with this invention. The lure 10 in this instance represents a first embodiment of my invention, which is a worm having a body portion 12 and a thin, flexible, elongate dorsal fin 14 extending longitudinally along the upper edge 16 of the body 12. It will be noted that the tip end 18 of the dorsal fin extends for a considerable distance beyond the tail portion 19 of the body portion 12 of the worm.

A hook-receiving portion, also known as the head portion 20, is located at the forwardmost part of the body portion 12. When a hook attached to a line has been inserted into the hook-receiving portion 20 and the lure thereafter pulled through the water, the elongate, flexible, relatively thin dorsal fin 14 ripples in a very realistic manner, essentially duplicating the swimming motion of an eel, snake, lizard or other such creature. This very realistic rippling of the dorsal fin is in contrast with the action of a dorsal fin with molded-in ripples, which does not move through the water in a realistic manner.

It will be noted from FIG. 1 that in the interests of providing flexibility, I have constructed the body portion 12 to be made up of alternating large sections 22 and relatively small sections 24. The relatively small sections in effect serve as hinging type connections between the large sections 22. It is to be noted that the body portion of my novel lure possesses relatively substantial rigidity in a direction perpendicular to the plane of the dorsal fin 14, but has substantial flexibility in the plane of the dorsal fin. The lateral rigidity of the body portion of my lure provides an ideal mounting for a dorsal fin intended to simulate the motion of an animal of prey swimming through the water.

Figure 2:
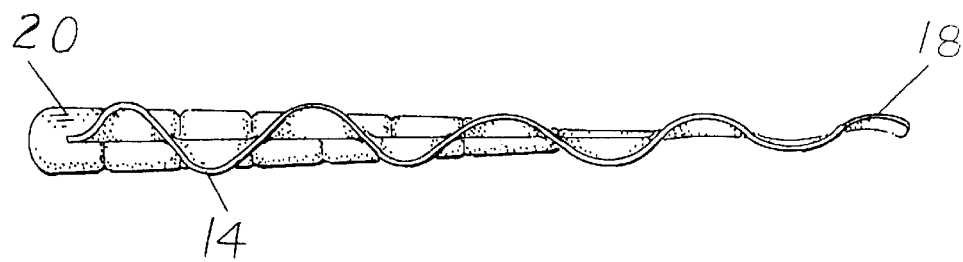
FIG. 2 is a view from above of my novel ribbon fin worm, with this view revealing a dorsal fin having a distinctive amount of rippling, with this rippling achieved without the necessity of the use of molds possessing a rippled configuration.

In FIG. 2 I have revealed the appearance of my novel worm embodiment when viewed from directly above, with it to be understood that the minor dimensions of the relatively small sections of the lure body are not apparent from this figure, for it is desired for the body to possess lateral rigidity, as indicated hereinabove. The relative narrowness of the sections 24 is apparent, however, from FIG. 3 and from FIG. 6b.

Figure 3:
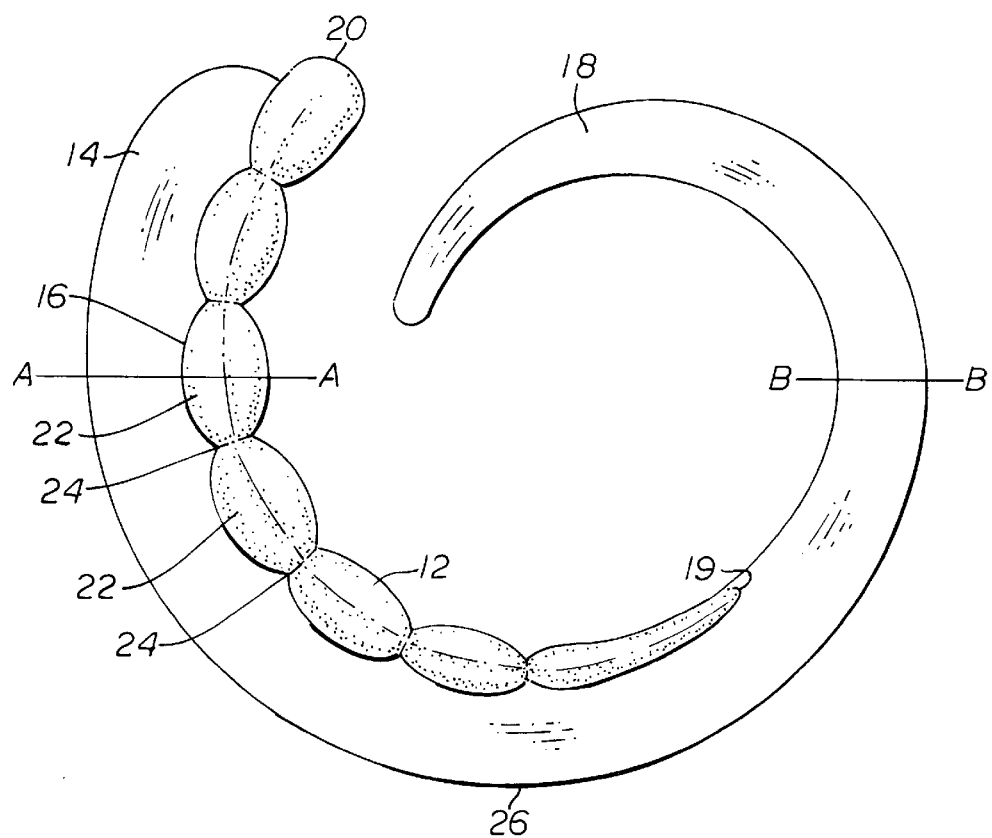
FIG. 3 is a showing, to a relatively large scale, of a typical lure in accordance with the worm embodiment of this invention, with it to be noted that the lure body in this position has a substantial amount of initial curvature and a flat dorsal fin.

FIG. 3 clearly depicts the worm embodiment of my novel lure in the curved configuration in which it is created, and from this figure it can be clearly seen that the large sections 22 are approximately twice the dimension of the relatively small sections 24. This novel arrangement serves the purpose of providing a highly satisfactory amount of flexibility to the body portion 12 in the plane of the initially flat dorsal fin 14, making it readily possible for the worm to move out of the initial curved configuration in which it is created, and into the fully operative positions shown in FIGS. 1 and 2.

I have found that a worm embodiment of my invention having approximately four to ten large sections interspersed between relatively small sections permits a worm initially created in a curved configuration to be readily stretched out into the straight configuration shown in FIG. 1 in such a manner that highly desirable ripples will be created in the relatively thin, flexible initially flat dorsal fin. In one exemplary embodiment, I utilized six large sections 22 and a like number of relatively small sections 24.

Also to be noted in FIG. 3 is the fact that the curved outer edge 26 of the relatively thin dorsal fin 14 is at a noticeably larger radius than the radius of the curved upper edge 16 of the body 12. This of course means that the length of the outer edge 26 of the fin is necessarily longer than a corresponding length of the upper edge 16 of the lure body 12. The cutting plane A—A through large body section 22, and the cutting plane B—B through the tail portion 18 appearing in FIG. 3 will be discussed hereinafter.

The fin 14 is flat and rippleless when the worm is residing in the substantially curved configuration depicted in FIG. 3. However, it is most important to note that upon the worm being moved into the configuration shown in FIG. 1, the water resistance straightens the worm body, forcing the long outer edge 26 of the relatively thin fin to undertake what may be regarded as a significant amount of wrinkling, or more appropriate to the context of this invention, a substantial amount of a highly desirable rippling. I have found that water resistance of the curved tail pulls on the body to straighten it, with the relatively thin dorsal fin having little strength to resist these forces and therefore it buckles, wrinkling in a desirable and effective manner. As another factor, the mass of the worm body is considerably larger than the mass of the relatively thin dorsal fin, with motion of the worm body in the plane of the dorsal fin exerting a considerable influence upon the motion of the fin.

Significantly, the relatively thin fin 14 created in accordance with this invention is able to freely undertake rippling motion as the lure moves through the water inasmuch as there would be no basis for the fin to possess any memory of having been molded with preformed ripples.

It was noted in the exemplary embodiment of this invention depicted in FIGS. 1 and 2 that the body portion 12 is made up of six relatively small sections 24 and a like number of large sections 22, with the elongate dorsal fin 14 being integral with all of these sections and extending beyond the tail portion 19 of the body portion of the lure. It was also noted that the dorsal fin is molded in a flat condition, and becomes rippled when the lure has been straightened out. Obviously I am not to be limited to six large sections and a like number of relatively small sections, for the numbers can range between 4 and 20. However, I avoid creating a body portion having too large a number of alternating large and relatively small sections, to avoid a situation leading to the tearing of the plastic of the lure when a hook is inserted. With reference to FIGS. 1 and 2 of the Firmin Patent No. 4,214,396 which issued Jul. 29, 1980, it will be noted that it possesses a large number of alternating large and relatively small body sections. It is obvious that a hook inserted between into or between body sections at the forward end of Firmin's lure body would run the substantial risk of causing the lure body to tear apart at that location.

Figure 4:
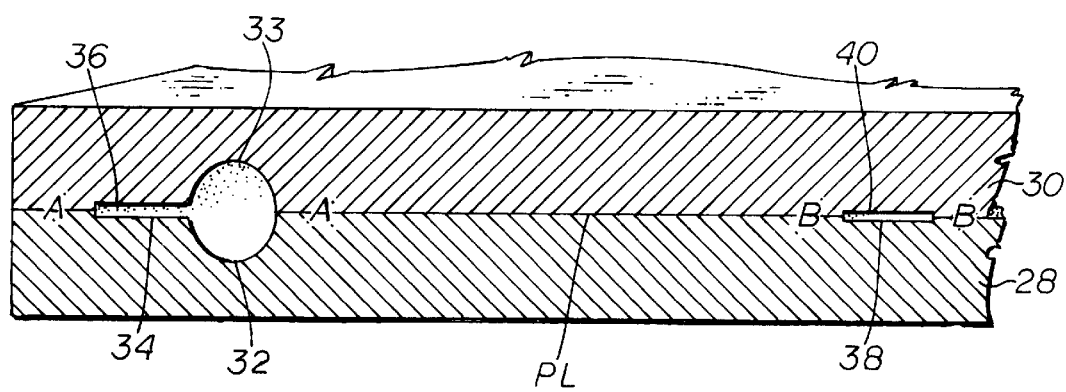
FIG. 4 is a view, to the same scale as FIG. 3, showing in cross section, parts of the active mold surfaces of the upper and lower molds utilized for creating the worm of FIG. 3, taken at locations A——A and B——B in FIG. 3.

Turning now to FIG. 4 it will be seen that I have shown in cross section, portions of upper and lower mold halves that are utilized for creating a single lure in accordance with this invention, with lower mold half 28 depicted in an aligned relationship with upper mold half 30. The portions of mold halves 28 and 30 shown in FIG. 4 reveal the configuration corresponding to the location A——A in FIG. 3 directly above, with it to be understood that contained in lower mold half 28 is a downwardly curving recess 32. Directly above the downwardly curving recess 32 is an upwardly curving recess 33 located in the upper mold half 30, with it to be understood that upon molten plastic being inserted between the mold halves, the juxtaposed downwardly curving portion 32 and the upwardly curving portion 33 will bring about the creation of the large body section 22 disposed at the location A—A in FIG. 3.

Most significantly, a flat portion 34 is cut adjacent the downwardly curving portion 32 of the lower mold half 28, and a flat portion 36, substantially identical to and parallel with the flat portion 34, is cut adjacent the upwardly curving portion 33 of mold half 30. These flat portions 34 and 36 are easily created at a desirable spacing, for they are consistent with respect to parting line PL of these mold halves. The flat surfaces 34 and 36 may for example be spaced 0.050" apart. However, the spacing may range between 0.015" and 0.100". A typical fin thickness may range between 0.025" and 0.078".

On the right hand side of FIG. 4 it will be noted that flat portion 38 in lower mold half 28 is directly below flat portion 40 in upper mold half 30. These flat portions are substantially identical and reside in a parallel relationship, thus being configured to enable the creation of the tail portion 18 of the lure depicted in FIG. 1.

The significance of the mold arrangement depicted in FIG. 4 will be discussed hereinafter.

Figure 5A:
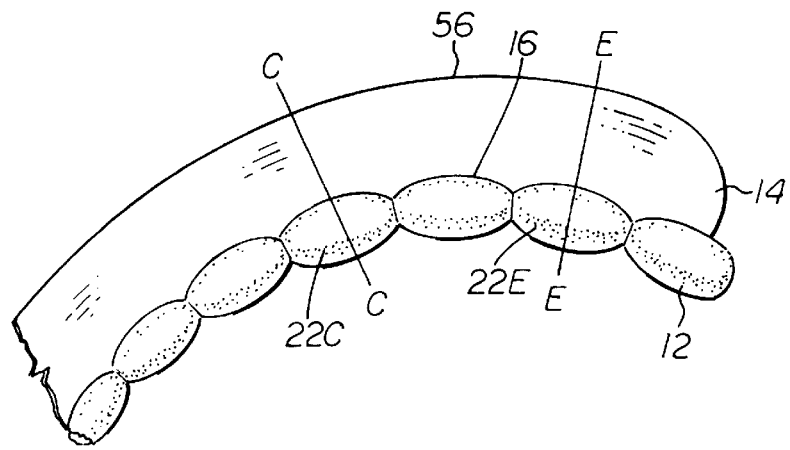
FIGS. 5a and 5b are related views showing how movement of the worm out of the curved configuration shown in FIG. 5a, into the extended position shown in FIG. 5b, has caused a highly advantageous rippling of the relatively thin fin.

Turning now to FIG. 5a, it will be noted that I have shown a fragmentary portion of my novel lure 10 in a curved position, in which a line C—C extends through large lure section 22c, and line E—E extends through large lure section 22e. The lines C—C and E—E are shown in an angular relationship, with the angle between these two lines reflecting the curvature of the lure.

It is to be noted in FIG. 5a that I have identified an arcuate contour 56 extending between the line C—C and the line E—E along the portion of the fin 14 disposed at the maximum radius. The contour 56 is obviously created at a substantially greater radius than the upper edge 16 of the body portion, to which the fin 14 attaches.

Figure 5B:
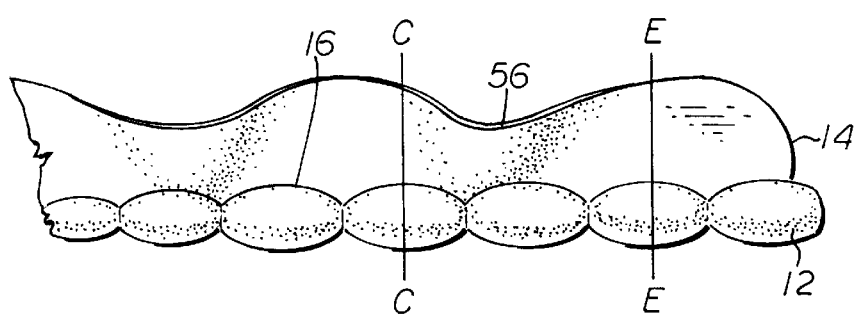

With reference to FIG. 5b, it will be noted that the lure body 12 has been moved into a straightened position, such that the line C—C passing through the mid portion of large section 22c, has been moved into a parallel relationship with the line E—E passing through the mid portion of large section 22e. I have found for most lures that the angle between lines C—C and E——E for a curved lure is in the range of 12° to 30°, with an angle of 25° being typical. The higher the fin, the less the curvature that is needed in order to bring about a desired rippling of the fin.

It is important to note that the straightening out of the lure body 12, which has much greater mass than the fin 14, has caused the arcuate contour 56 of the relatively thin fin 14 to be compacted, with this fin portion undertaking the significant amount of rippling depicted in FIG. 5b. This rippling of the large but thin dorsal fin is of course quite important to my invention.

Figure 6A:
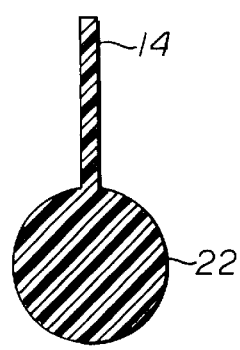
FIG. 6a is a typical cross sectional view of one of the large body portions of my novel worm, with it to be noted that the flat, relatively thin dorsal fin is symmetrically located with respect to the body portion, and has considerably less surface area than the body portion.

With reference to FIG. 6a, which is a cross sectional view, it will be seen that at this location I have shown a typical large body section 22, extending upwardly from which is a portion of the thin dorsal fin 14 integral with the body section. From this view it will be observed that the mass of a typical body section 22 is much greater than the mass of a typical fin portion. For example, the area of the typical body section 22 is approximately 4 times the area of the corresponding fin section.

Figure 6B:
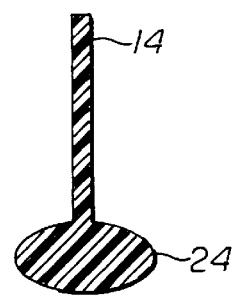
FIG. 6b is a typical cross sectional view of one of the relatively small body sections of my worm, with it to be noted that the major dimension of this body section is perpendicular to the plane of the flat, relatively thin dorsal fin, with the minor dimension of this body section being sufficiently small as to enable hinging of the worm body to take place at such locations.

FIG. 6b, in contrast with FIG. 6a, is a cross sectional view of a typical relatively small body section 24, extending upwardly from which is a portion of the same thin dorsal fin 14. From this view it will be observed that the mass of a typical body section 24 is much smaller than the mass of a typical large body section. It is also to be noted that the area of the body section 24 is only about 1.5 times the area of the corresponding fin section. Significantly, the major dimension of the relatively small body portion 24 is perpendicular to the plane of the fin 14, which brings about substantial lateral stability to the lure. However, the relatively small minor dimension of the section 24 enables the small sections to serve as hinging points for the body member, with a consequent, highly desirable rippling of the fin when the lure has moved into a straight configuration.

Although I obviously am not to be limited to any particular configuration, in the exemplary embodiment of my invention depicted in these two related figures, the typical large section 22 of the body portion 12 illustrated in FIG. 6a has a major dimension of 0.300" and was essentially round, with a flat fin member approximately 0.050" in thickness extending outwardly therefrom in a symmetrical manner. The total height of this embodiment, including the fin, is 0.619 inches. I am not, however, to be limited to these dimensions.

FIG. 6b reveals that in this exemplary embodiment, the comparatively small section 24 is generally elliptical in configuration, with the minor axis of the ellipse measuring .115", and the major axis of the ellipse measuring 0.263". As in the case of FIG. 6a, the fin portion 14 is located in a symmetrical relationship to the elliptically-shaped comparatively small portion 24 and is likewise 0.050" in thickness. It is to be noted, however, that I am not to be limited to these dimensions or to comparatively small lure body sections that are elliptical, for they can be of other configurations, such as generally rectangular.

By having the comparatively small sections 24 of the lure approximately less than half the vertical dimension of the large sections 22, it can be expected that rotation in the plane of the fin can take place in each of the comparatively small sections of the lure, such that the lure can readily move into a straight line configuration despite the fact it was initially molded in a curved configuration. However, as mentioned hereinbefore, my novel lure has considerable lateral stability inasmuch as in most instances, the dimension of the major axis of the relatively small sections of the worm is the minimum width of the main body portion of the worm.

Figure 7:
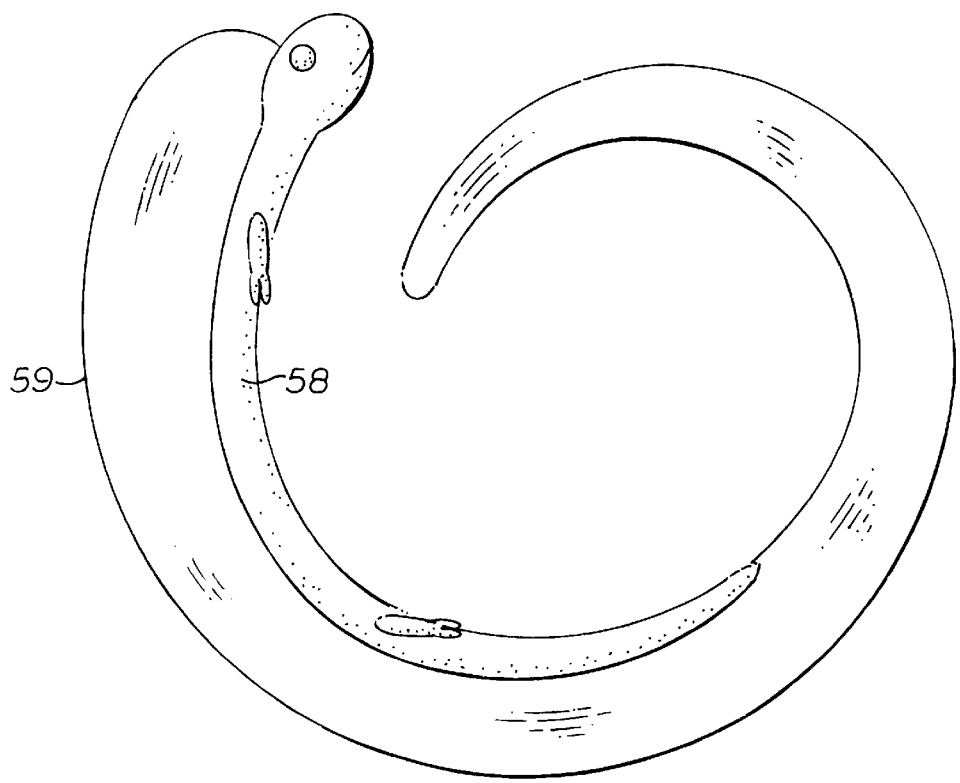
FIG. 7 is another embodiment of my invention, in this instance a lizard having four legs, with the lizard being initially molded in essentially the same curvature as the worm of FIG. 3.
Figure 8:
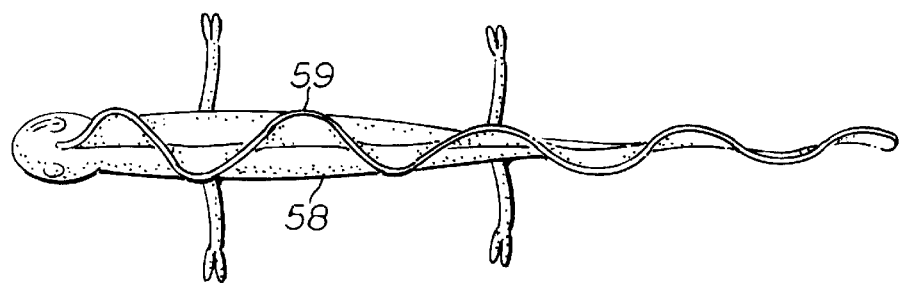
FIG. 8 is a view related to FIG. 7 and in this instance reveals the lizard viewed from above, with this view illustrating a dorsal fin having a distinctive amount of rippling, with this rippling achieved without the necessity of the use of molds possessing a rippled configuration.

With reference now to FIG. 7, it will be noted that I have at this location shown another major embodiment of my invention, in this instance a lure in the form of a lizard 58 having four legs. As was explained in connection with FIG. 3 hereinabove, the lizard is initially created in a curved configuration, by the use of mold sections having flat portions at the locations where the dorsal fin 59 is to be created. Because the dorsal fin is relatively thin, it is immediately able to assume the highly desirable, rippled configuration depicted in FIG. 8 at such time as the lizard has been moved into a relatively straight configuration. The head of the lizard is relatively large, making it an ideal location for the insertion of a fish hook. As is obvious, as the lizard is pulled through the water, the action of the water is able to cause the body of the lizard to assume a relatively straight configuration, with the flexible, relatively thin dorsal fin assuming a highly desirable amount of rippling.

Figure 9A:
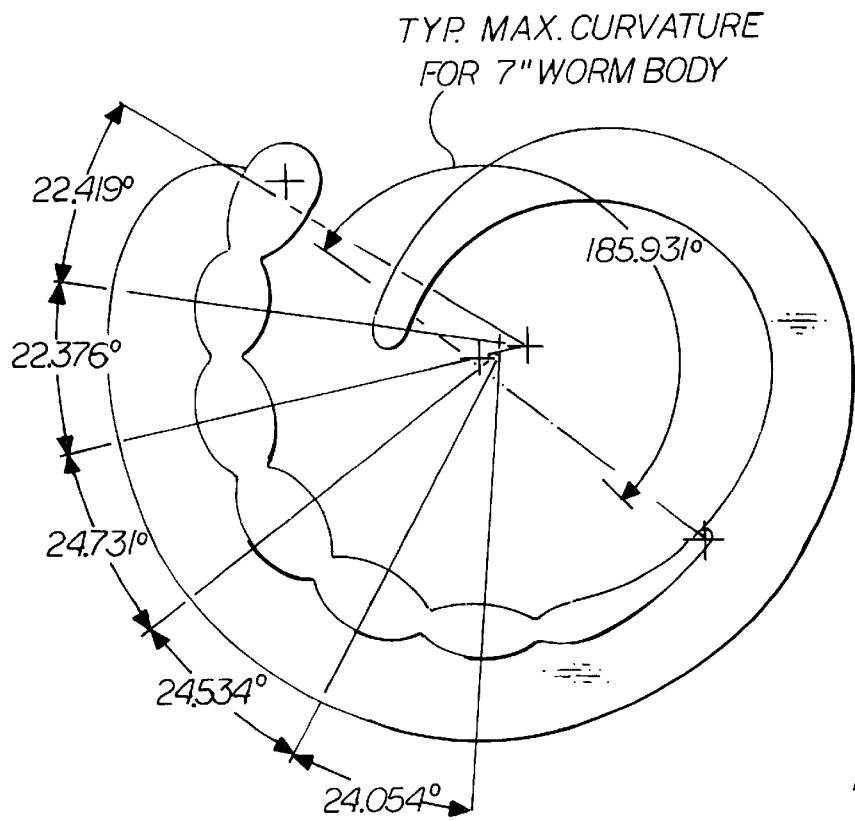
FIGS. 9a and 9b are views upon which typical angles, dimensions and radii are set forth with regard to lures that are approximately 7" in length, but to which angles, dimensions and radii I am not to be limited.
Figure 9B:
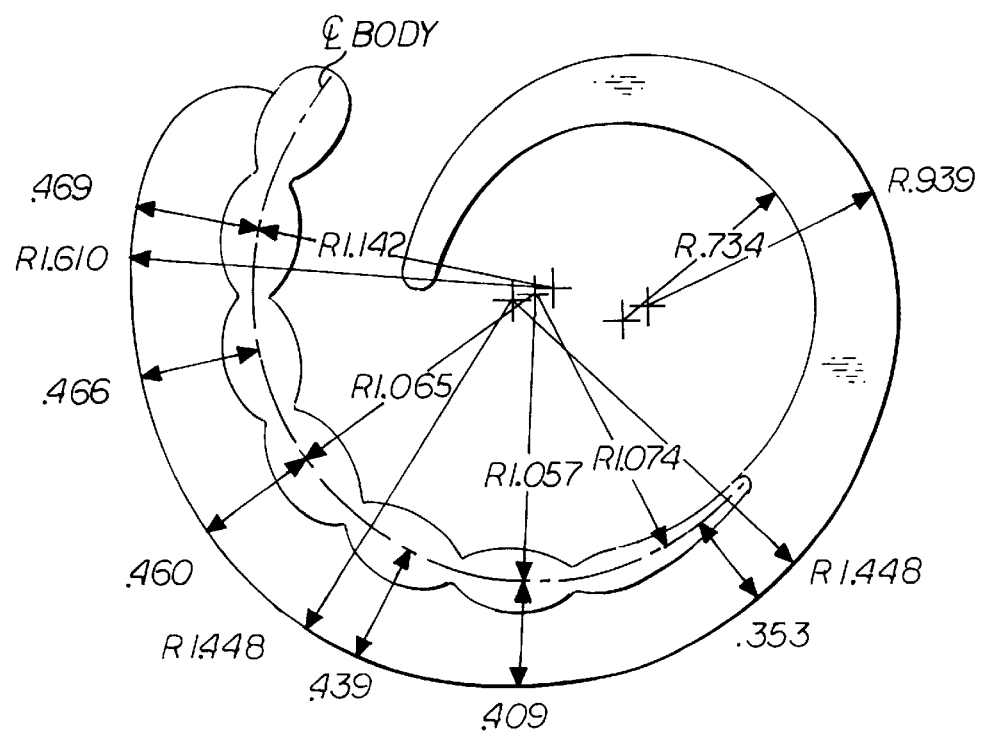

Turning now to FIGS. 9a and 9b, it will be seen that I have provided some typical information with regard to the manner in which a typical worm body is configured at the time it is molded from hot plastic. In FIG. 9a it will be noted that I have set forth some typical angles that may exist between the mid points of successive large body sections of the worm, whereas in FIG. 9b I have shown the radii at which worm portions may be created. In both of these figures it will be noted that the radii are typically given with respect to slightly different points of origin.

In FIG. 9b I also show typical heights of the outer edge of the dorsal fin from the mid point locations of the large body sections. Although it is apparent that any consequential amount of curvature of my novel lure will result in rippling to some degree of the thin, large dorsal fin, for lures in the 7" to 10" range, the radius of curvature of the lure at the time of its molding may range between 1" and 2", with a radius of 1⅛" having been used for one preferred embodiment. In such instance the outer edge of the fin typically extends about 7/16" above the upper edge of the lure body. Obviously I am not to be limited to the dimensions, radii or angles depicted in FIGS. 9a and 9b.

Figure 10:
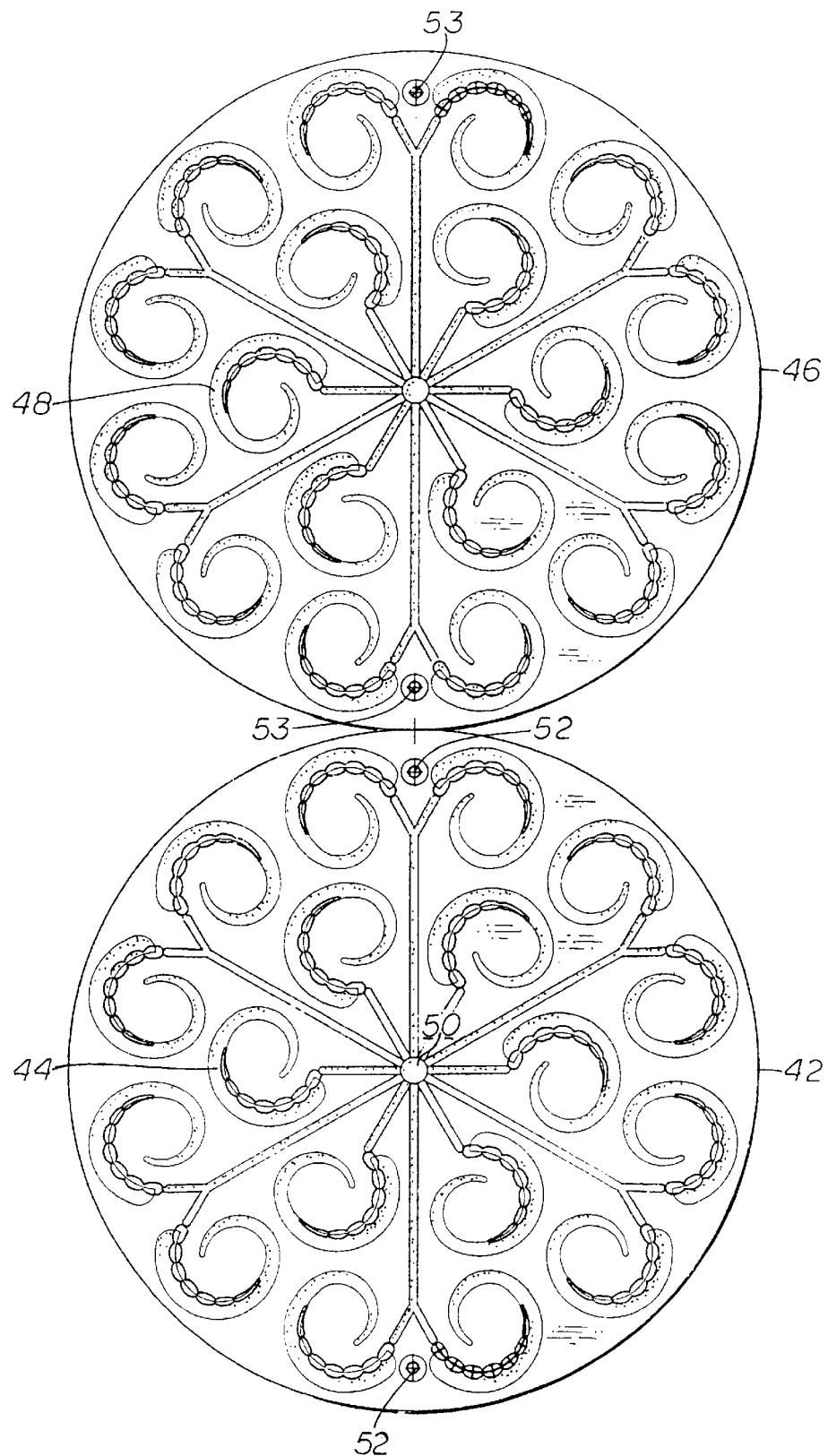
FIG. 10 is a view to a relatively small scale of the upper and lower molds of the type able to simultaneously create a number of my novel lures, with each of such lures in an initially curved configuration.

With reference now to FIG. 10, it is to be noted that a circular mold arrangement of the type I prefer to utilize is made up of upper and lower metal sections or components which contain an equal number of cavity portions, with it to be understood that the lower mold section 42 is disposed below, and in careful alignment with, the upper mold section 46 at the time hot plastic is to be inserted into the cavities of these molds in order to bring about the creation of plastic lures.

It is important to observe that each of the cavity portions in the lower mold section 42 possess substantial curvature, with each of these substantially curved cavities laid out in a careful relationship to the respective substantially curved cavities formed in the upper mold section 46. A typical cavity portion in the lower mold section 42 is shown at 44, whereas the corresponding cavity portion in the upper mold section 46 is shown at 48, with the cavity portions 44 and 48 being disposed in careful alignment so that properly formed lures will be created.

As a result of this arrangement, a preestablished number of completed cavities are the result of the mold sections 42 and 46 being brought into a contiguous relationship preparatory to receiving an injection of molten plastic.

Although the upper and lower mold sections are separately shown in FIG. 10, it is to be understood that in the usual instance, the upper and lower mold sections are hingedly secured together. In a typical instance, when the mold sections have been moved into an interfitted relationship, twelve to twenty carefully configured upper cavities will be moved into desired alignment with an equal number of carefully configured lower cavities, thus forming what may be regarded as completed cavities. In the instance depicted in FIG. 10, it will be noted that eighteen lures, each possessing substantial curvature, will be created in accordance with this invention at the time of each injection of molten plastic.

Two or more alignment pins 52 are utilized in the lower mold section 42, to assure a careful alignment with the upper mold section 46 when the sections are brought into an operative relationship. The alignment pins 52 enter recesses 53 in the upper mold section when the mold sections are interfitted, thus to assure a careful alignment of the curved cavities of the two mold sections.

As by now should be clear, molten plastic at an appropriately high temperature is forced into the completed cavities, such as cavities 44,48 called out in FIG. 10, with the molten plastic being caused to take on the configuration of the worms or lures that have been created. The particular number of cavities in a given mold is usually not of critical importance.

In accordance with the process I utilize in connection with my novel mold sections, molten PVC at approximately 340° Fahrenheit is injected into an inlet opening or hole 50 provided on the underside of the lower mold section 42, in the center thereof. The molten plastic then flows radially outwardly through the twelve or so radially extending passages and into the completed cavities provided in the interfitted mold sections, to fill such cavities and in doing so, to create the substantially curved worms.

It is most important to understand that in the typical instance, there is a parting line that is consistent across the entire width of each mold half, and in the case of the mold halves 42 and 46, there are no protrusions extending beyond the plane of the active surface of either mold half. However, this generality does not apply when molds have been created for the injection of lures having preformed ripples.

Figure 11:
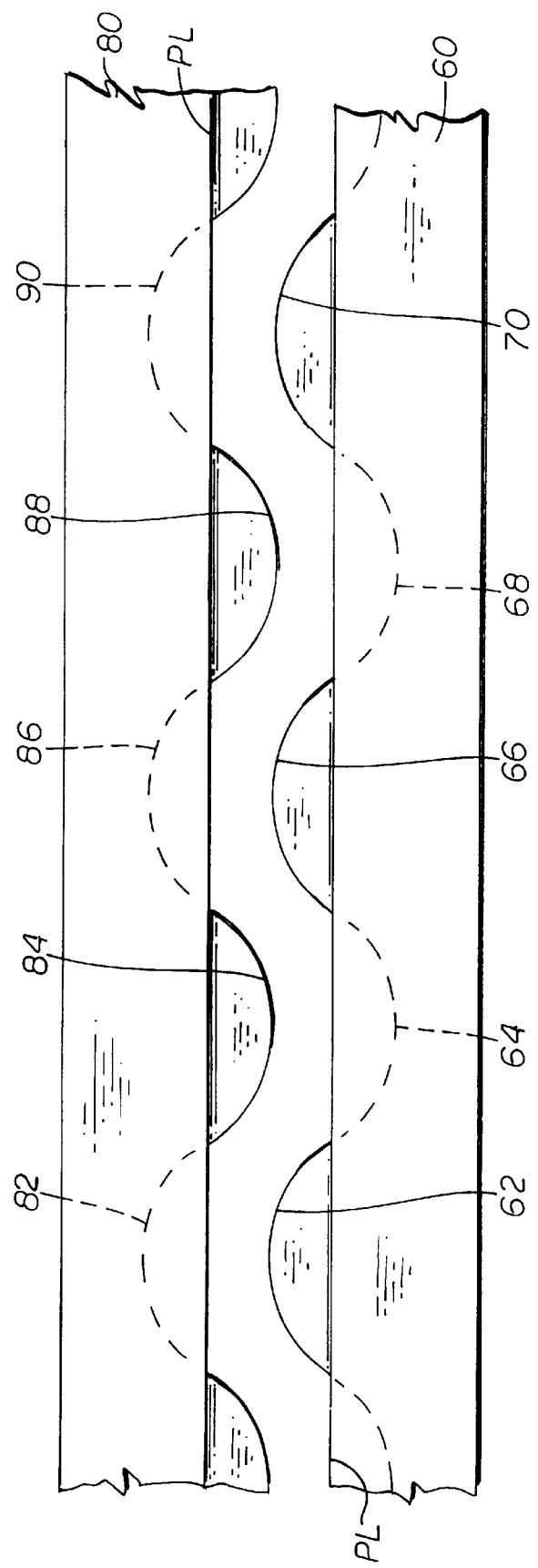
FIG. 11 is a showing to a comparatively large scale of fragmentary portions of mold halves provided in accordance with the teachings of the prior art, wherein lures are created with preformed fins.

Turning now to FIG. 11, which has been captioned "Prior Art," it will be noted that I have shown upper and lower mold sections to a scale that is unrealistically large in the interests of clarity. It will be seen that lower mold section 60 and upper mold section 80 are designed to interfit in order that a lure having preformed ripples can be created by the injection of molten plastic.

With initial reference to lower mold section 60, for one part of a ripple to be created, there must be protrusions beyond the parting line PL of the lower mold 60, which in this instance involves an upwardly curving protrusion 62 extending above the parting line PL. This outwardly extending protrusion is followed by a downwardly curving recess 64, which is then followed by another upwardly curving protrusion 66 extending above the parting line PL, which in turn is followed by another downwardly curving recess 68, and thereafter followed by another upwardly curving protrusion 70, and so forth, with this continuing for the length of the fin having preformed ripples to be created.

Because a pair of molds is obviously involved in the above example for the injection molding of plastic lures, there must necessarily be a properly shaped curved recess in the upper mold half 80 corresponding to each upwardly curving protrusion of the lower mold, and quite importantly, there must be a downwardly curving protrusion on the upper mold directly above each of the downwardly curving recesses of the lower mold half 60.

With reference to the upper mold half 80 depicted in FIG. 11, it will be noted that a recess 82 is provided directly above the upwardly curving protrusion 62, whereas a downwardly curving protrusion 84 is located directly above the recess 64 provided in the lower mold half 60. Following directly from the downwardly curving protrusion 84 is an upwardly curving recess 86 in the upper mold, smoothly followed by a downwardly curving protrusion 88, which thereafter blends smoothly with the upwardly curving recess 90, and so forth.

It is thus to be seen in FIG. 11 that each of the outwardly curving protrusions of the upper and lower molds must extend beyond the parting line PL of its respective mold, and it is manifestly true that each of these protrusions must closely match the inwardly curving recesses of the other mold if preformed fins of the desired thinness are to be created on the lures.

It is therefore to be understood that in order to be able to create lures having preformed rippled fins, it would be necessary for there to be several protrusions that extend for a tangible distance beyond the contours of each mold half, or in other words, these protrusions must extend beyond the parting line of each mold.

It is to be realized that it is a tedious and time consuming procedure to create the arcuately configured protrusions 62, 66 and 70 of the lower mold half 60, and the arcuately configured protrusions 84 and 88 of the upper mold half 80, each of which extends beyond the parting line PL of the respective mold half. In order for these protrusions to be created, material must be removed from each basic blank or plate at the locations where no protrusions are desired, with substantial amounts of metal to be removed at locations where recesses of one mold half must conform to the protrusion of the other mold half. It is therefore obvious that a machinist must start out with a disk or plate of aluminum or other appropriate material having considerable initial thickness if protrusions of the proper arcuate configuration are to extend above the parting line of each of the matching disks to be created.

Even employing the services of skilled programmers and machinists, it will often take a skilled team from six to ten tries before achieving matching mold halves in which the outwardly curving protrusions of one mold half precisely match the inwardly curving recesses of the other mold half, with the arrangement being such that a fin of precisely correct thickness and configuration will be created on each lure.

From the foregoing it should be obvious that the expense of creating molds having protrusions extending beyond the parting line or surface plane of each mold half is so substantial as to warrant distinct efforts to find a better way of creating lures with rippled fins than to use molds designed to create preformed ripples.

Referring back to FIG. 4, it will be recalled with regard to the mold sections 28 and 30 that a flat portion 34 is cut adjacent the downwardly curving portion 32 of the lower mold half 28, and a flat portion 36, substantially identical to and parallel with the flat portion 34, is cut adjacent the upwardly curving portion 33. These flat portions 34 and 36 are easily created, for they are consistent with respect to the parting line PL of these mold halves.

In the right hand side of FIG. 4 it will be noted that flat portion 38 in lower mold half 28 is directly below flat portion 40 in upper mold half 30, with these being substantially identical and configured to enable the creation of the tail portion 18 of the lure depicted in FIG. 1.

It is most significant to realize that the juxtaposed flat portions 34 and 36, and the juxtaposed flat portions 38 and 40 of FIG. 4 are responsible for creating the dorsal fin portions of the lure of FIGS. 1 and 2 without the programmer and the machinist having to go through the ordeal of creating protrusions extending beyond the parting line or surface plane of the mold halves. This highly advantageous result is achieved by molding the lures in accordance with this invention in a substantially curved configuration, as shown in FIGS. 3, 7, 9a, 9b and 10.

As explained in conjunction with FIGS. 5a and 5b, the length of the outer contour 56 of the fin 14 is necessarily longer than a comparable portion of the upper edge 16 of the lure body 12. The fin 14 is flat and rippleless when the lure is residing in a substantially curved configuration, but upon the lure body being straightened out into the configuration shown in FIG. 1, the long outer edge 26 of the relatively thin fin 14 is forced to undertake what may be regarded as a significant amount of wrinkling, or more appropriate to the context of this invention, a substantial amount of a highly desirable amount of rippling. The same effect is also depicted in FIG. 5b, wherein the outer contour of the dorsal fin is shown having undertaken a desirable amount of rippling.

Returning to a further consideration of FIG. 10, upon the completed lures being removed from the molds, they can, by virtue of the lure bodies having been created to have the comparatively small sections 24 serving as hinging points, be readily moved into a straight extended position, which will cause the once flat dorsal fins of each of the newly-created lures to undertake a highly desirable rippled condition. As previously mentioned, because these once flat dorsal fins have no memory of any curvature, they can quite easily conform to the water through which the lures are passing, and thereby create a much more realistic "swimming" effect than is possible with lures having preformed dorsal fins.

It should now be apparent that mold halves of the type depicted in FIG. 10 are much less expensive to make and much less expensive to maintain than the mold halves depicted in FIG. 11, wherein the arcuately configured protrusions extending beyond the parting line or boundary of one mold must be closely matched with the recesses of the other mold.

The fins created between the flat surfaces of the mold halves depicted in FIG. 10 are relatively easy to create, and any extensive contouring of the one member to match the curvature of the other member is completely obviated by the employment of the instant technique.

As made abundantly clear hereinabove, the initially flat fins undertake a highly desirable rippled configuration at such time as the initially curved lures are moved outwardly into a straightened position. Although I have primarily described this invention in the context of a worm and a lizard each having a rippled dorsal fin, I am not to be limited to this, for my invention could be utilized in connection with the creation of other animals, such as eels, snakes and the like.

I claim:

1. An artificial fishing lure created in an initially curved configuration, said lure being of resilient material which, when attached to a line and pulled through the water, essentially duplicates the swimming motion of an eel, snake, or lizard, said lure having a body portion and a flexible, elongate dorsal fin integral with said body portion and extending longitudinally for substantially the entire length of said body portion, said fin being essentially flat and relatively thin, said body portion having a non-symmetrical cross-section, involving major and minor dimensions, with the major dimension of said body portion being perpendicular to the plane of said relatively thin fin and the minor dimension of said body portion being essentially parallel to the plane of said essentially flat, relatively thin fin, said minor dimension being less than two-thirds of the dimension of said major dimension, with the relative smallness of said minor dimension enabling the lure to move from an initially curved configuration into an essentially straight configuration, said relatively thin fin being essentially flat when said lure is in a curved configuration, but undertaking a rippled configuration when said lure has moved into a straight configuration.

2. The artificial fishing lure created in an initially curved configuration and made of resilient material as recited in claim 1 in which the rearmost portion of said fin extends beyond the lure body and forms a curled tail.

3. The artificial fishing lure created in an initially curved configuration and made of resilient material as recited in claim 1 in which said lure is a worm, with the body portion of said lure made up of alternating large and relatively small sections, with said relatively small sections corresponding to said minor dimension of said body portion.

4. The artificial fishing lure created in an initially curved configuration and made of resilient material as recited in claim 3 in which the minor dimension of each of the small sections is sufficiently small as to enable such small sections to serve as hinging points of the body portion of the worm such that the worm can move from an initially curved configuration into an essentially straight configuration.

5. The artificial fishing lure of resilient material as recited in claim 3 in which there are between four and ten alternating large and relatively small sections constituting said body portion.

6. The artificial fishing lure of resilient material as recited in claim 3 in which each of the large sections of said body portion has approximately four times the cross sectional area of the adjacent fin section, so that when the worm body is straightened, the fin will be foreshortened and forced to form ripples.

7. The artificial fishing lure of resilient material as recited in claim 3 in which one of said large sections constitutes the forwardmost portion of said worm, with said forwardmost portion being relatively thick and ideal for the insertion therein of a fish hook, with the thickness of said forwardmost portion making unlikely the hook tearing out of the body portion of the worm during use.

8. The artificial fishing lure created in an initially curved configuration and made of resilient material as recited in claim 1 in which said body portion is in the configuration of a lizard having four legs.

9. The artificial fishing lure created in an initially curved configuration and made of resilient material as recited in claim 8 in which said lizard has a thick head suitable for the insertion therein of a hook, a relatively narrow neck, and a relatively wide midsection.

10. An artificial fishing lure created in an initially curved configuration, said lure being of resilient material which, when attached to a line and pulled through the water, essentially duplicates the swimming motion of an eel, snake, or lizard, said lure having a body portion and a flexible, elongate dorsal fin integral with said body portion and extending longitudinally for substantially the entire length of said body portion, said fin being essentially flat and relatively thin, said body portion having a non-symmetrical cross-section, involving major and minor dimensions, with the major dimension of said body portion being perpendicular to the plane of said relatively thin fin and the minor dimension of said body portion being essentially parallel to the plane of said essentially flat, relatively thin fin, with the relative smallness of said minor dimension, when compared with the major dimension, enabling the lure to move from an initially curved configuration into an essentially straight configuration, said relatively thin fin being essentially flat when said lure is in a curved configuration, but undertaking a rippled configuration when said lure has moved into a straight configuration.

11. The artificial fishing lure created in an initially curved configuration and made of resilient material as recited in claim 10 in which the rearmost portion of said fin extends beyond the lure body and forms a curled tail.

* * * * *